United States Patent
Brück et al.

(10) Patent No.: US 7,189,274 B2
(45) Date of Patent: Mar. 13, 2007

(54) EXHAUST GAS FILTER WITH AT LEAST ONE FILTER LAYER AND METHOD FOR PRODUCING A FILTER LAYER

(75) Inventors: Rolf Brück, Bergisch Gladbach (DE); Jan Hodgson, Troisdorf (DE); Markus Mengelberg, Overath (DE)

(73) Assignee: Emitec Gesellschaft für Emissionstechnologie mbH, Lohmar (DE)

( * ) Notice: Subject to any disclaimer, the term of this patent is extended or adjusted under 35 U.S.C. 154(b) by 182 days.

(21) Appl. No.: 11/049,550

(22) Filed: Feb. 2, 2005

(65) Prior Publication Data
US 2005/0166563 A1 Aug. 4, 2005

Related U.S. Application Data

(63) Continuation of application No. PCT/EP03/08227, filed on Jul. 25, 2003.

(30) Foreign Application Priority Data
Aug. 2, 2002 (DE) ................. 102 35 764

(51) Int. Cl.
*B01D 46/00* (2006.01)
*B01D 39/20* (2006.01)

(52) U.S. Cl. .............. 55/525; 55/282.2; 55/282.3; 55/385.3; 55/487; 55/495; 55/523; 55/526; 55/527; 55/DIG. 10; 55/DIG. 30; 60/311; 219/78.01; 219/85.1; 219/85.12; 219/85.15; 219/121.13; 219/121.6; 264/628; 264/500; 264/DIG. 48; 156/60; 156/272.2

(58) Field of Classification Search ............ 55/282.2, 55/282.3, 385.3, 486, 487, 495, 497, 498, 55/499, 520, 522, 523, 525, 526, 527, DIG. 5, 55/DIG. 10, DIG. 30; 60/311; 219/78.01, 219/85.1, 85.12, 85.13, 85.15, 121.13, 121.6; 264/628, 500, DIG. 48; 156/60, 272.2
See application file for complete search history.

(56) References Cited

U.S. PATENT DOCUMENTS 2,663,660 A * 12/1953 Layte .................... 55/497
3,067,504 A * 12/1962 Lubben et al. .......... 55/DIG. 5

(Continued)

FOREIGN PATENT DOCUMENTS

DE 195 39 168 A1 4/1997

(Continued)

*Primary Examiner*—Jason M. Greene
(74) *Attorney, Agent, or Firm*—Laurence A. Greenberg; Werner H. Stemer; Ralph E. Locher

(57) ABSTRACT

An exhaust gas filter for cleaning an exhaust gas of an internal combustion engine includes at least one strip-shaped filter layer made of a material through which a fluid can at least partly flow. The filter layer has a length in a longitudinal direction and a width in a transverse direction. The filter layer has a metallic reinforcing region at least in a partial region. The metallic reinforcing region has a width and a length. The width of the reinforcing region is less than the width of the filter layer and/or the length of the reinforcing region is less than the length of the filter layer. A method for producing a filter layer for an exhaust gas filter is also provided.

26 Claims, 3 Drawing Sheets

U.S. PATENT DOCUMENTS

| | | | |
|---|---|---|---|
| 3,242,562 A * | 3/1966 | Kraft | 55/525 |
| 3,679,057 A * | 7/1972 | Perez | 55/DIG. 5 |
| 3,724,177 A * | 4/1973 | Grote | 55/486 |
| 4,363,753 A * | 12/1982 | Bozon et al. | 502/439 |
| 5,183,488 A * | 2/1993 | Deering | 55/486 |
| 5,609,761 A | 3/1997 | Franz | |
| 5,814,118 A * | 9/1998 | Wickland et al. | 55/525 |
| 5,865,864 A * | 2/1999 | Bruck | 55/525 |
| 6,142,362 A | 11/2000 | Maus et al. | |
| 6,387,143 B1 * | 5/2002 | Adiletta | 55/497 |
| 6,652,615 B2 * | 11/2003 | Quick et al. | 55/495 |
| 6,949,155 B1 * | 9/2005 | Lang et al. | 55/498 |
| 2004/0187456 A1 | 9/2004 | Bruck | |
| 2004/0194440 A1 | 10/2004 | Bruck et al. | |
| 2005/0050869 A1 * | 3/2005 | Haes | 55/497 |

FOREIGN PATENT DOCUMENTS

| | | |
|---|---|---|
| DE | 101 53 283 A1 | 5/2003 |
| DE | 101 53 284 A1 | 5/2003 |

\* cited by examiner

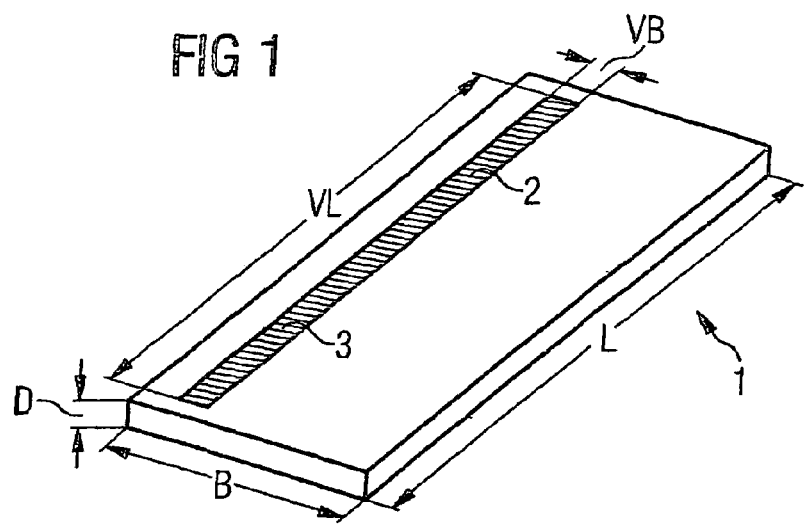
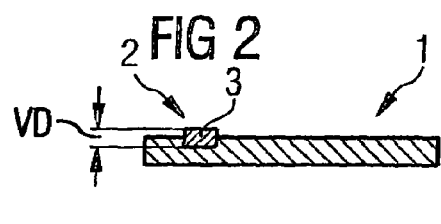
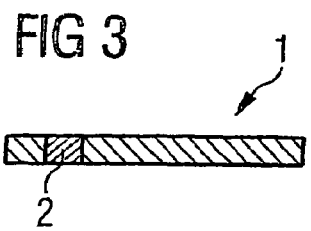
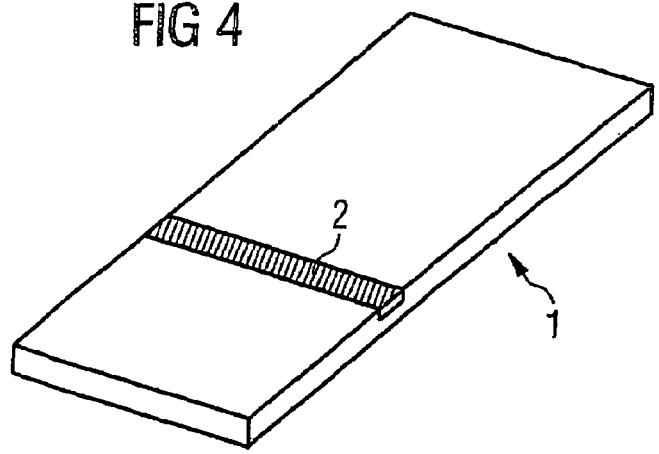
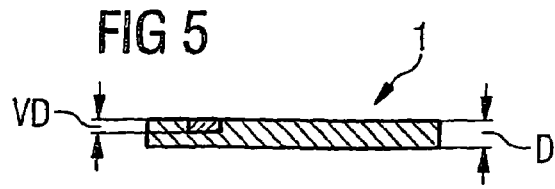

EXHAUST GAS FILTER WITH AT LEAST ONE FILTER LAYER AND METHOD FOR PRODUCING A FILTER LAYER

CROSS-REFERENCE TO RELATED APPLICATION

This is a continuing application, under 35 U.S.C. § 120, of copending international application No. PCT/EP2003/008227, filed Jul. 25, 2003, which designated the United States; this application also claims the priority, under 35 U.S.C. § 119, of German patent Application 102 35 764.1, filed Aug. 2, 2002; the prior applications are herewith incorporated by reference in their entirety.

BACKGROUND OF THE INVENTION

Field of the Invention

The invention relates to an exhaust gas filter for cleaning an exhaust gas of an internal combustion engine, including at least one filter layer. The invention also relates to a method for producing a filter layer including at least one metallic reinforcing region.

In order to filter out particulates from the exhaust gas of an internal combustion engine, in particular a diesel engine, various filter systems have been developed, for example a so-called open filter system, which is distinguished by the fact that the passage walls forming the filter system are constructed at least partly from porous or highly porous material. Furthermore, there are diverting or guiding structures, which have the effect of diverting the flow with the particulates contained therein to the regions made of porous or highly porous material. It has surprisingly been found in that case that interception and/or impaction causes the particulates to remain adhesively attached on and/or in the porous passage wall.

The pressure differences in the flow profile of the flowing exhaust gas are of significance for that effect to materialize. The diversion may additionally cause high local subatmospheric or superatmospheric pressure conditions, which lead to a filtration effect through the porous wall, since the aforementioned pressure differences must be equalized. In contrast to the known closed filter systems, it is referred to as an open filter system because no flow dead ends are provided. A particulate filter is referred to as open whenever it can in principle be passed through completely by particles, to be precise even by particles which are considerably larger than the particulates which are actually to be filtered out. As a result, such a filter cannot become clogged during operation, even if there is an agglomeration of particulates. A suitable method for measuring the openness of a particulate filter is, for example, that of testing up to which diameter spherical particles can still trickle through such a filter. In the case of the present applications, a filter is open in particular when spheres of a diameter greater than or equal to 0.1 mm can still trickle through, preferably spheres with a diameter above 0.2 mm. In an extreme case, it is even possible to see through an open filter.

Such a filter system is described, for example, in German Published, Non-Prosecuted Patent Application DE 101 53 283 A1, corresponding to U.S. Patent Application Publication No. US 2004/0194440 A1 and German Published, Non-Prosecuted Patent Application DE 101 53 284 A1, corresponding to U.S. Patent Application Publication No. US 2004/0187456 A1.

In the case of such open filter systems there is often the problem of the filter layers which are used having inadequate mechanical stability. This can be overcome by forming corresponding frame structures, which however have other disadvantages. Filter systems with filter layers without a frame structure fray relatively quickly when the filter layers on the gas inlet side are subjected to pulsating loading. Furthermore, it is only with difficulty that the filter layers can be molded into durable structures, which can possibly lead to an improvement in the filtering effect.

SUMMARY OF THE INVENTION

It is accordingly an object of the invention to provide an exhaust gas filter with at least one filter layer that has an increased mechanical stability and improved possibilities for joining to adjacent layers and a method for producing a filter layer, which overcome the herein afore-mentioned disadvantages of the heretofore-known devices and methods of this general type.

With the foregoing and other objects in view there is provided, in accordance with the invention, an exhaust gas filter for cleaning an exhaust gas of an internal combustion engine. The exhaust gas filter comprises at least one strip-shaped filter layer made of a material through which a fluid can at least partly flow. The material through which a fluid can at least partly flow has a thickness. The at least one filter layer has a length in a longitudinal direction and a width in a transverse direction. The at least one filter layer has a metallic reinforcing region at least in a partial region. The metallic reinforcing region has a width and a length. The width of the reinforcing region is less than the width of the filter layer and/or the length of the reinforcing region is less than the length of the filter layer.

The incorporation of metallic reinforcing regions in the filter layer advantageously allows the construction of mechanically stable filter layers. It is only unimportant parts of the surface of the filter layer through which a fluid can flow that are covered by the reinforcing regions.

For example, it is possible to form a reinforcing region in the edge region on a gas inlet side of a filter layer, which has the effect of causing the latter to be durable for a much longer time than conventional products, since the reinforcing region in this case can bring about protection against blowing out, and therefore prevent fraying of the filter layers at the edge. The mechanical loads to which a filter layer is subjected are particularly great in the gas inlet region, since exhaust gas usually impinges on the filter layer in a pulsating manner and the thermal loads are also at their greatest in this region.

Furthermore, the formation of reinforcing regions also permits much better moldability, which allows even fibrous filter layers to be molded into structured filter layers. This makes it possible for the exhaust gas filter to be constructed in the form of a conventional honeycomb body in which it is possible for the filter layer to be used as a smooth layer and/or as a structured layer. The honeycomb body may also contain nonporous sheet-metal layers. For example, it is possible according to the invention to construct the honeycomb body serving as an exhaust gas filter from smooth filter layers and structured sheet-metal layers in the accustomed way, without using structured filter layers and smooth sheet-metal layers. The reinforcing regions are also particularly suitable regions for connections by joining techniques to adjacent layers. The preferred manner of carrying out the joining technique is by brazing. However, a sintering process or even welding may be used as well.

In accordance with another feature of the invention, the filter layer is formed from fibrous material, with a formation of the filter layer from metal fibers being preferred and from sintered metal fibers particularly preferred. The production of the filter layers from fibrous material, preferably from metal fibers, provides increased thermal stability of the filter layers, which is of advantage specifically in exhaust gas filters, since the exhaust gases of an internal combustion engine have a relatively high temperature and occur in a pulsating form. Consequently, it is advantageous to form the filter layer from metal fibers in particular whenever the exhaust gas filter is installed close to the engine. The thickness of such filter layers is less than 2 mm, in particular less than 1 mm.

In accordance with a further feature of the invention, the at least one reinforcing region is formed at an edge of the at least one filter layer. The formation of the reinforcing region at the edge advantageously prevents fraying of the filter layer in this region and therefore provides the filter layer with an increased service life.

In accordance with an added feature of the invention, the reinforcing region is formed in an inner strip. The formation of the reinforcing region in an inner strip brings about increased dimensional stability of the filter layer and in this way advantageously allows the structuring of the filter layer.

It is possible according to the invention for the reinforcing region to be formed in a single strip or a number of strips, which may, if appropriate, also occur periodically. With respect to the position of the reinforcing region in relation to the filter layer, it is possible for it to be formed as a longitudinal strip, as a transverse strip or at any desired angle in relation to the edges of the filter layer. One of the advantages of the formation of a number of reinforcing regions is a greatly increased dimensional stability of the filter layer. Another advantage is that the formation of a number of reinforcing regions also permits reliable joining of the filter layer to other layers in the exhaust gas filter in the reinforcing regions, without the surface area of the filter layer that accepts the flow of gas being reduced significantly by the reinforcing regions. The reinforcing regions may preferably have a rectangular form, but any desired shape of the reinforcing regions is possible and, according to the invention may, for example, be an oval, circle, segment of a circle, triangle, etc.

In accordance with an additional feature of the invention, the reinforcing region is formed by a sheet-metal layer or a brazing material inclusion. Both possibilities can easily be integrated in the production process of a filter layer. Furthermore, these two possibilities are particularly advantageous with respect to a metallic filter layer, since a connection of the reinforcing region to the filter layer can be formed in a simple manner in this case, for example by thermal treatment of the brazing material inclusion or by brazing or welding in the case of the sheet-metal layer. Both the possibility of forming the reinforcing region as a brazing material inclusion and the possibility of forming it as a sheet-metal layer offer an advantageous increase in the mechanical stability of the filter layer. The sheet-metal layers have a thickness of less than 0.08 mm, in particular less than 0.04 mm or even less than 0.02 mm.

In accordance with yet another feature of the invention, the reinforcing region has an increased material density. For example, it is possible according to the invention to form the reinforcing region by exerting a pressing force. Furthermore, it is advantageously possible for more material to already be provided in the reinforcing region when the filter layer is being formed, in order to allow the material density to be increased there later by rolling. It is particularly advantageous in this connection to compress the reinforcing region.

In accordance with yet a further feature of the invention, the thickness of the reinforcing region is less than the thickness of the material through which a fluid can flow. This advantageously also allows the reinforcement of materials that are relatively thick in comparison with the reinforcing region, for example taking the form of a sheet-metal layer, and are mechanically reinforced by thin reinforcing regions. Depending on the properties of the reinforcing region, a relatively great mechanical stabilization of the filter layer can also be achieved with comparatively thin reinforcing regions.

In accordance with yet an added feature of the invention, the reinforcing region has structures. In particular, whenever the thickness of the reinforcing region is less than the thickness of the material through which a fluid can flow, it is possible by forming structures in the reinforcing region to adapt the latter to the thickness of the material through which a fluid can flow. This allows great mechanical stabilization of the material through which a fluid can flow to be obtained with relatively low expenditure on material, without having great fluctuations in the extent of the thickness. Furthermore, it is also possible to structure the entire fibrous material in this way. It is particularly advantageous in this connection if the outer total amplitude of the structuring corresponds at least to the thickness of the material through which a fluid can flow. It is also just as advantageous if the outer total amplitude of the structuring is less than the thickness of the material through which a fluid can flow.

In accordance with yet an additional feature of the invention, the reinforcing region is threaded through the filter portion in such a way that the reinforcing region is alternately on a first longitudinal side and on a second longitudinal side of the filter layer. This formation of the reinforcing region is of advantage in particular for the formation of a protection against blowing out, since in this way both end faces of the filter layer can be protected against fraying in a simple manner.

In accordance with again another feature of the invention, the reinforcing region is connected to the filter layer by a method using a joining technique. A connection by a joining technique may be incorporated in a simple manner in already existing method sequences for creating an exhaust gas filter. For example, the reinforcing regions may be brazed to a remaining portion of the filter layer when a general brazing of the exhaust gas filter is performed for the production of a stable overall structure.

In accordance with again a further feature of the invention, the reinforcing region is welded to the filter layer. Resistance welding methods, in particular the roller seam welding method, or laser welding methods, are appropriate in this case in particular. The roller seam welding method has the effect at the same time of causing a certain pressure to act on the filter layer, which can lead to the compaction of the material and consequently to further reinforcement of the filter layer. A weld seam formed in a stable manner between the reinforcing region and the filter layer leads to a further mechanical reinforcement of the filter layer.

Further connecting methods using joining techniques are also possible and within the scope of the invention. For example, the at least one reinforcing region may also be riveted to the filter layer. A combination of methods using joining techniques, for example riveting and brazing or else riveting and welding, is possible and within the scope of the invention. For example, it is possible in an advantageous way for a brazing foil to be as it were pre-fixed as a reinforcing region by riveting and for the reinforcing region to be finally fixed later by brazing. The formation of the reinforcing region by bringing about an increased material density is possible in combination with other methods using joining techniques. For example, an increased material density can be brought about by rolling or pressing. In this case, too, it is possible in an advantageous way to combine different methods, for example a combination of pressing and welding, preferably resistance welding, roller seam welding or spot welding with wide electrodes.

In accordance with again an added feature of the invention, the reinforcing region is connected to adjacent sheet-metal layers. It is particularly advantageous in this connection that the reinforcing region is brazed to adjacent sheet-metal layers. In this way it is possible to create a permanent connection for example between a layer which is formed substantially from fibrous material and a sheet-metal layer. This leads to an improvement in the durability of the exhaust gas filter according to the invention.

With the objects of the invention in view, there is also provided a method for producing a filter layer for an exhaust gas filter. The method comprises producing the filter layer, having a length in a longitudinal direction and a width in a transverse direction, from a material through which a fluid can at least partly flow. The material through which a fluid can at least partly flow has a thickness. A metallic reinforcing region, having a width and a length, is formed in at least a partial region of the filter layer. The width of the reinforcing region is dimensioned to be less than the width of the filter layer and/or the length of the reinforcing region is dimensioned to be less than the length of the filter layer. The reinforcing region is connected to the material through which a fluid can at least partly flow, by a joining technique.

In accordance with another mode of the invention, the material through which a fluid can flow is formed from fibers, preferably from metal fibers and particularly preferably from sintered metal fibers. Filter layers made of metal fibers have a great thermal stability, which is advantageous for use in the exhaust region of an internal combustion engine.

In accordance with a further mode of the invention, the reinforcing region is formed by a sheet-metal layer, a brazing material inclusion or a region with increased material density.

In accordance with an added mode of the invention, the reinforcing region is brazed to the material through which a fluid can flow. The formation of a brazed connection may advantageously be incorporated in already existing method steps for the production of an exhaust gas filter. This allows the formation of the brazed connection to take place in the same working step as the formation of other brazed connections in the exhaust gas filter.

In accordance with a concomitant mode of the invention, the welded connection is formed in the reinforcing region. In this connection, it is particularly advantageous to form the welded connection by resistance welding or laser welding, preferably by roller seam welding. It is advantageous for a welded connection between the reinforcing region and the remaining material through which a fluid can flow to be formed specifically by a resistance welding method, in this case in particular preferably the roller seam welding method since, when the reinforcing region is formed as a material region with increased material density, this can be performed in one operation with the roller seam welding, because a contact pressure acts in this case on the filter layer. Furthermore, the use of structured roller seam welding tools makes it possible for a structuring to be directly stamped on in the reinforcing region. For example, the roller seam welding can be performed by a kind of toothed wheel, which leads to the formation of, for example, corrugated or undulating structures in the reinforcing region, and consequently also in the entire filter layer, just provided that there are sufficient reinforcing regions, dependent on the rigidity of the material through which a fluid can flow.

Other features which are considered as characteristic for the invention are set forth in the appended claims.

Although the invention is illustrated and described herein as embodied in an exhaust gas filter with at least one filter layer and a method for producing a filter layer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a first exemplary embodiment of a filter layer with a reinforcing region according to the invention;

FIG. 2 is a lateral-sectional view of the first exemplary embodiment;

FIG. 3 is a lateral-sectional view of a second exemplary embodiment;

FIG. 4 is a perspective view of a third exemplary embodiment;

FIG. 5 is a lateral-sectional view of the third exemplary embodiment of a filter layer;

DESCRIPTION OF THE PREFERRED EMBODIMENTS

Figure 6:
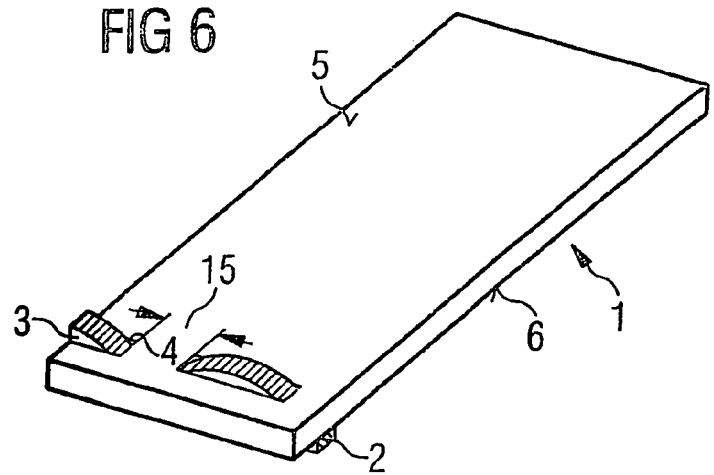
FIG. 6 is a perspective view of a fourth exemplary embodiment of a filter layer with a reinforcing region.

Referring now to the figures of the drawings in detail and first, particularly, to FIG. 1 thereof, there is seen a filter layer 1, which has a length L in a longitudinal direction, a width B in a transverse direction and a thickness D. The filter layer 1 is produced from porous material through which a fluid can at least partly flow. Specifically, it is possible to produce such a filter layer 1 from metal fibers, in particular from sintered metal fibers. The filter layer 1 has a reinforcing region 2 with a width VB which is less than the width B of the filter layer 1. A length VL of the reinforcing region 2 is less than the corresponding length L of the filter layer 1.

As is represented in FIG. 2, the filter layer 1 may have a reinforcing region 2, which is formed by a sheet-metal layer 3. In FIG. 2, the thickness VD of the sheet-metal layer 3 is shown to be relatively great in comparison with the thickness D of the filter layer 1, but it may also be significantly smaller. It is possible to connect the sheet-metal layer 3 to a remaining region of the filter layer 1 outside the reinforcing region 2 through the use of a welding method, in particular a resistance welding method or laser welding method, particularly preferably a roller seam welding method.

FIG. 3 shows a second exemplary embodiment of a filter layer 1 with a reinforcing region 2. In this case, the reinforcing region 2 is formed by providing an increased material density in the reinforcing region 2. This can be achieved by already providing more material in this region when the filter layer is produced from metal fibers. In order to equalize any differences in height that there may be, the material in this region can later be compressed. It is also possible to form the fiber material uniformly and to compress the material only in the reinforcing region 2.

FIG. 4 shows a third exemplary embodiment of a filter layer 1 with a transversely running reinforcing region 2. In general, the reinforcing region 2 may not only be formed transversely or longitudinally in relation to the edges of the filter layer 1, but may be formed at any desired angle in relation to the edges of the filter layer 1. Any alignment of the reinforcing region 2 with respect to the filter layer 1 is within the scope of the invention. In the exemplary embodiment shown in FIG. 4, the reinforcing region 2 is formed as a brazing material inclusion. For this purpose it is possible, for example, to use the fact that the porous material from which the filter layer 1 is constructed absorbs the liquid brazing material.

FIG. 5 shows an exemplary embodiment which, as in FIG. 4, is formed by brazing material inclusions. It can be seen that the reinforcing region 2 does not extend over the entire thickness D of the filter layer. The thickness VD of the reinforcing region is less than the thickness D. This can be achieved by corresponding dimensioning of the amount of brazing material which is absorbed by the filter layer 1 and use of corresponding measures to prevent brazing material flow.

The formation of the brazing material inclusion can be advantageously incorporated in already existing method steps for the production of exhaust gas filters. Thermal method steps, such as for example brazing, are often used in such methods for connecting various components of the exhaust gas filter. In this case, the forming of the reinforcing region can be integrated into the production process without any further expenditure.

The fact that the thickness VD of the reinforcing region is less than the thickness D of the filter layer 1 and therefore that the brazing material inclusion does not extend through the entire thickness D of the filter layer 1, leads to a reinforcement of the filter layer 1, but not to a complete stiffening of the layer in the reinforcing region 2. Depending on the field of application, it is also possible, according to the invention, to perform a brazing material inclusion of a thickness VD which is identical to the thickness D of the filter layer. This is a way of obtaining a filter layer which, due to the reinforcing region 2, can be molded more permanently than a filter layer 1 without a reinforcing region 2.

FIG. 6 shows a further exemplary embodiment of a filter layer 1 with a reinforcing region 2. In this exemplary embodiment, the reinforcing region 2 is made up of a thin sheet-metal layer 3, which is threaded through holes 4 in the filter layer 1. The threading of the sheet-metal layer 3 through the holes takes place in such a way that the sheet-metal layer 3 is alternately on a first longitudinal side 5 and a second longitudinal side 6 of the filter layer 1. In the production process it is possible to connect the sheet-metal layer 3 to the filter layer 1, after the threading-through, by roller seam welding. In this case, a firm connection is formed between the sheet-metal layer 3 and the filter layer 1. The formation of such a welded connection is preferred in particular in the edge region of the filter layer 1, since a sheet-metal layer 3 connected to the filter layer 1 in this way is well suited as protection against blowing out on the gas inlet side of the exhaust gas filter. However, good protection against blowing out can also be achieved by the configurations shown in the other exemplary embodiments.

It is possible to structure the sheet-metal layer 3 by roller seam welding with a tool which has a structure, for example a kind of toothed wheel. When constructing an exhaust gas filter, it is advantageous to position the holes 4 in the filter layer 1 in such a way that a spacing 15 between the holes 4 corresponds approximately to a length of corrugations or undulations of the stamped-on structure. If corrugation-like or wave-like structures are stamped on, it is also advantageous if corrugation or wave peaks and/or corrugation or wave troughs are respectively pronounced in the region of the holes 4. In this way it is possible to produce a structured filter layer 1 reinforced with a sheet-metal layer 3 which has a respective sheet-metal layer 3 in the region of abutment with adjacent layers in the exhaust gas filter, that advantageously permits the formation of a firm connection to the adjacent layer.

According to the invention, when providing strips for mechanical reinforcement, formation of the strips is generally not restricted to strips in the edge region, but rather any desired region in the filter layer can be mechanically reinforced. Depending on the formation of the regions, it is also possible to structure the filter layers permanently, and to use them, for example, as corrugated or undulated layers in a honeycomb body.

Figure 7:
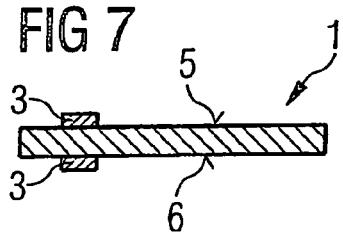
FIG. 7 is a lateral-sectional view of the fourth exemplary embodiment of a filter layer.

FIG. 7 shows a lateral-sectional view of the exemplary embodiment of FIG. 6. It can be seen that part of the sheet-metal layer or band 3 is on the first longitudinal side 5 and another part of the sheet-metal layer or band 3 is on the second longitudinal side 6 of the filter layer 1.

Figure 8:
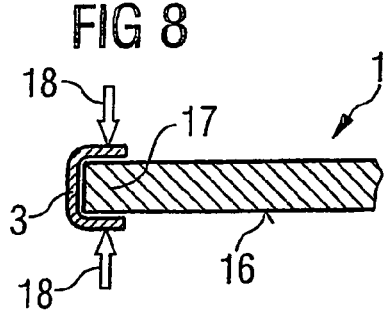
FIG. 8 is a sectional view used to show a method for the production of a fifth exemplary embodiment of a filter layer.

FIG. 8 is a lateral-sectional view showing a method for the production of a further exemplary embodiment of a filter layer 1. In this case, a sheet-metal layer 3 is folded in an edge region 17 around a fiber mat 16, which is formed of a porous material through which a fluid can flow. Subsequently, the edge region 17 is compressed, as represented by arrows 18. This may take place advantageously by roller seam welding, in which a welded connection between the sheet-metal layer 3 and the fiber mat 16 is formed simultaneously with the compression.

Figure 9:
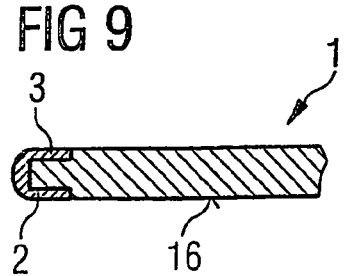
FIG. 9 is a lateral-sectional view of the fifth exemplary embodiment.

The reinforced filter layer 1 produced in this way is shown in FIG. 9. It has a reinforcing region 2 in the edge region 17 of the filter layer 1. This reinforcing region may be connected to adjacent sheet-metal layers during the construction of an exhaust gas filter, for example by forming a brazed connection. Moreover, the formation of a reinforcing region 2 at the edge by a folded-around metal sheet 3 in a filter layer 1 can be used particularly advantageously as protection against blowing out.

Figure 10:
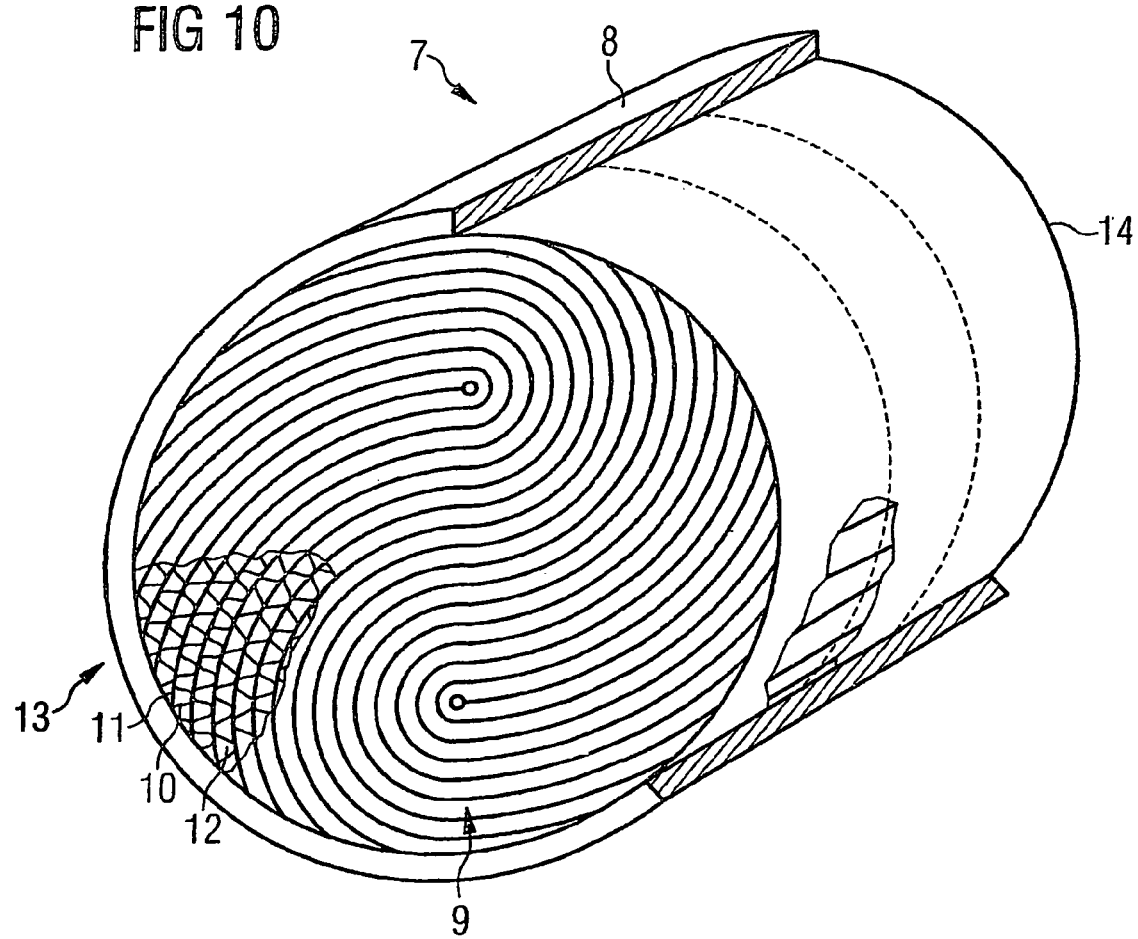
FIG. 10 is a fragmentary and partly broken-away perspective view of an embodiment of the exhaust gas filter according to the invention.

The exemplary embodiments of filter layers with metallic reinforcing regions that are shown in FIGS. 1 to 9 are suitable for the construction of an exhaust gas filter 7 according to the invention that is represented in FIG. 10. The exhaust gas filter 7 is constructed as a honeycomb body including a casing or jacket tube 8 and a honeycomb structure 9. The honeycomb structure 9 includes corrugated or undulated layers 10 and smooth layers 11, which form passages 12 through which a fluid can flow. According to the invention, it is possible to construct the smooth layers 11 and/or the corrugated layers 10 from a filter layer with a metallic reinforcing region. If the smooth layers 11 are then constructed, for example, from filter layers 1 with reinforcing regions 2, it is possible to construct the corrugated layers 10 from normal sheet-metal layers. These may have structures and apertures, which direct the gas flowing through the exhaust gas filter 7 to the smooth layer 11 formed as the filter layer 1.

In addition, when the corrugated layers 10 are formed from filter layers 1 with reinforcing regions 2, it is possible to provide the smooth layers 11 with structures which bring about swirling and deflection of the gas stream flowing through the exhaust gas filter 7 in the direction of the corrugated layers 10 formed as the filter layer 1.

According to the invention, it is advantageous, when installing the exhaust gas filter 7 in the exhaust line of an internal combustion engine, to form a gas inlet side 13 of the exhaust gas filter 7 preferably with reinforcing regions 2. These reinforcing regions 2 serve as protection against blowing out, which prevents fraying of the filter layers 1 being caused by hot and pulsating streams of exhaust gas. The problem of fraying is not as great on a gas outlet side 14, but according to the invention reinforcing structures can also be formed there, for example for the purely mechanical reinforcement and stabilization of the honeycomb structure.

An exhaust gas filter constructed according to the invention is formed at least partly by filter layers 1 with reinforcing regions 2. The formation of the reinforcing region 2 serves for the mechanical stabilization of the filter layer 1. Furthermore, a connection by a joining technique with respect to adjacent sheet-metal layers 10, 11 in the exhaust gas filter may be formed in the reinforcing region 2.

We claim:

1. An exhaust gas filter for cleaning an exhaust gas of an internal combustion engine, the exhaust gas filter comprising:
    at least one strip-shaped filter layer made of a material through which a fluid can at least partly flow, said material through which a fluid can at least partly flow having a thickness;
    said at least one filter layer having a length in a longitudinal direction and a width in a transverse direction;
    said at least one filter layer having a metallic reinforcing region at least in a partial region;
    said metallic reinforcing region having a width and a length; and
    at least one of:
        said width of said reinforcing region being less than said width of said filter layer, or
        said length of said reinforcing region being less than said length of said filter layer; and
    said at least one filter layer having a remaining region outside said reinforcing region, and said reinforcing region being connected to said remaining region by a process using a joining technique.

2. The exhaust gas filter according to claim 1, wherein said at least one filter layer is fanned from fibrous material.

3. The exhaust gas filter according to claim 1, wherein said at least one filter layer is formed from metal fibers.

4. The exhaust gas filter according to claim 1, wherein said at least one filter layer is formed from sintered metal fibers.

5. The exhaust gas filter according to claim 1, wherein said reinforcing region is at least one reinforcing region formed at an edge of said at least one filter layer.

6. The exhaust gas filter according to claim 1, wherein said reinforcing region is formed in an inner strip of said at least one filter layer.

7. The exhaust gas filter according to claim 1, wherein said reinforcing region is formed by a sheet-metal layer.

8. The exhaust gas filter according to claim 1, wherein said reinforcing region is formed by a brazing material inclusion.

9. The exhaust gas filter according to claim 1, wherein said at least one filter layer has a remaining region outside said reinforcing region, and said reinforcing region has an increased material density as compared to said remaining region.

10. The exhaust gas filter according to claim 9, wherein said reinforcing region is compressed.

11. The exhaust gas filter according to claim 1, wherein said reinforcing region has a thickness being less than said thickness of said material through which a fluid can at least partly flow.

12. The exhaust gas filter according to claim 1, wherein said reinforcing region has structures.

13. The exhaust gas filter according to claim 12, wherein said structures have an outer total amplitude corresponding at least to said thickness of said material through which a fluid can at least partly flow.

14. The exhaust gas filter according to claim 12, wherein said structures have an outer total amplitude being less than said thickness of said material through which a fluid can at least partly flow.

15. An exhaust gas filter for cleaning an exhaust gas of an internal combustion engine, the exhaust gas filter comprising:
    at least one strip-shaped filter layer made of a material through which a fluid can at least partly flow, said material through which a fluid can at least partly flow having a thickness;
    said at least one filter layer having a length in a longitudinal direction and a width in a transverse direction;
    said at least one filter layer having a metallic reinforcing region at least in a partial region;
    said metallic reinforcing region having a width and a length; and
    at least one of:
        said width of said reinforcing region being less than said width of said filter layer, or
        said length of said reinforcing region being less than said length of said filter layer; and
    said at least one filter layer having first and second longitudinal sides, said reinforcing region being threaded through said at least one filter layer, and said reinforcing region being alternately disposed on said first longitudinal side and on said second longitudinal side.

16. The exhaust gas filter according to claim 1, wherein said reinforcing region is welded to said remaining region.

17. The exhaust gas filter according to claim 1, wherein said reinforcing region is connected to adjacent sheet-metal layers.

18. The exhaust gas filter according to claim 17, wherein said reinforcing region is brazed to adjacent sheet-metal layers.

19. A method for producing a filter layer for an exhaust gas filter, which comprises the following steps:
    producing the filter layer, having a length in a longitudinal direction and a width in a transverse direction, from a material through which a fluid can at least partly flow, the material through which a fluid can at least partly flow having a thickness;

forming a metallic reinforcing region, having a width and a length, in at least a partial region of the filter layer;

providing a remaining region outside of said reinforcing region;

dimensioning at least one of:
 the width of the reinforcing region to be less than the width of the filter layer, or
 the length of the reinforcing region to be less than the length of the filter layer, and connecting the reinforcing region to the remaining region, by a process using a joining technique.

20. The method according to claim 19, which further comprises forming the material through which a fluid can at least partly flow from fibers.

21. The method according to claim 19, which further comprises forming the material through which a fluid can at least partly flow from metal fibers.

22. The method according to claim 19 which further comprises forming the material through which a fluid can at least partly flow from sintered metal fibers.

23. The method according to claim 19, which further comprises selecting the reinforcing region from the group consisting of a sheet-metal layer, a brazing material inclusion and a region with increased material density.

24. The method according to claim 19, which further comprises carrying out the step of connecting the reinforcing region to the material through which a fluid can at least partly flow by brazing.

25. The method according to claim 19, which further comprises forming a welded connection in the reinforcing region.

26. The method according to claim 25, which further comprises forming the welded connection by a process selected from the group consisting of resistance welding, laser welding and roller seam welding.

* * * * *